June 2, 1953  S. F. GARNER ET AL  2,640,714
VEHICLE SPLASH GUARD CONSTRUCTION
Filed May 26, 1950  2 Sheets-Sheet 1
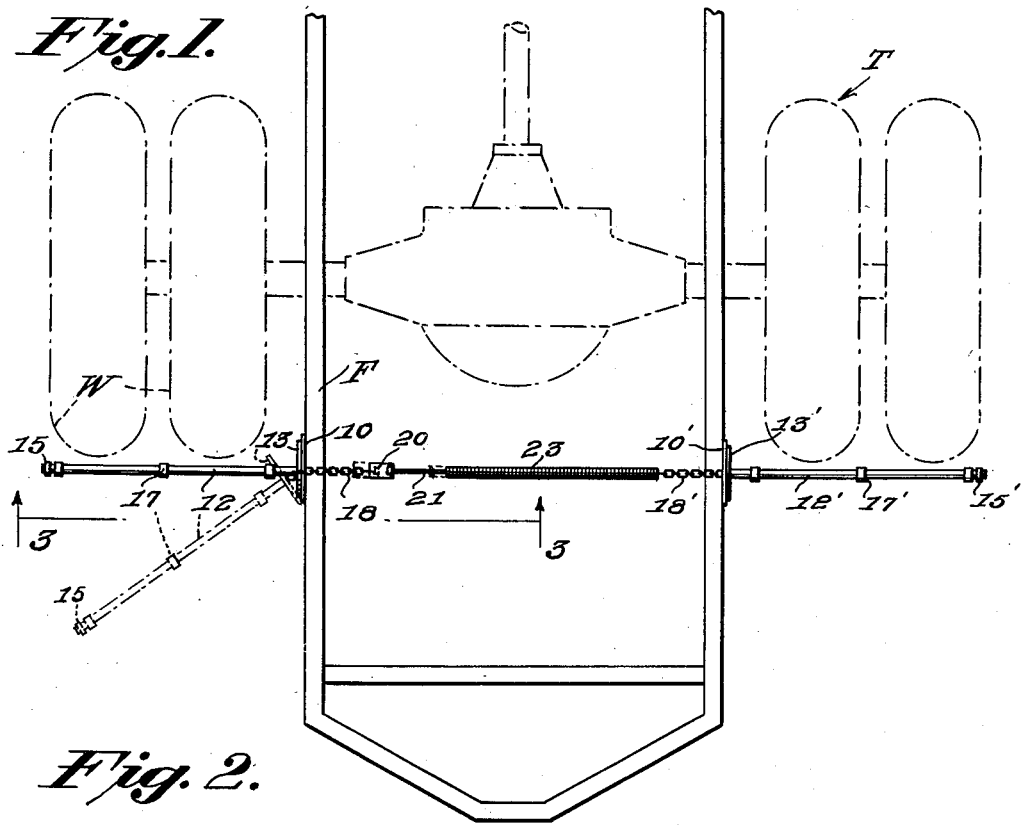
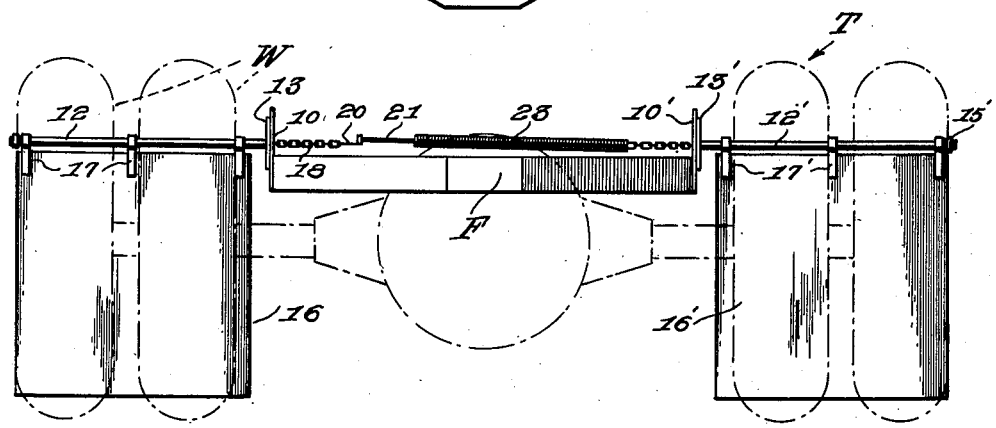
Inventors,
Silver F. Garner,
Kenneth T. Heap
Attorney

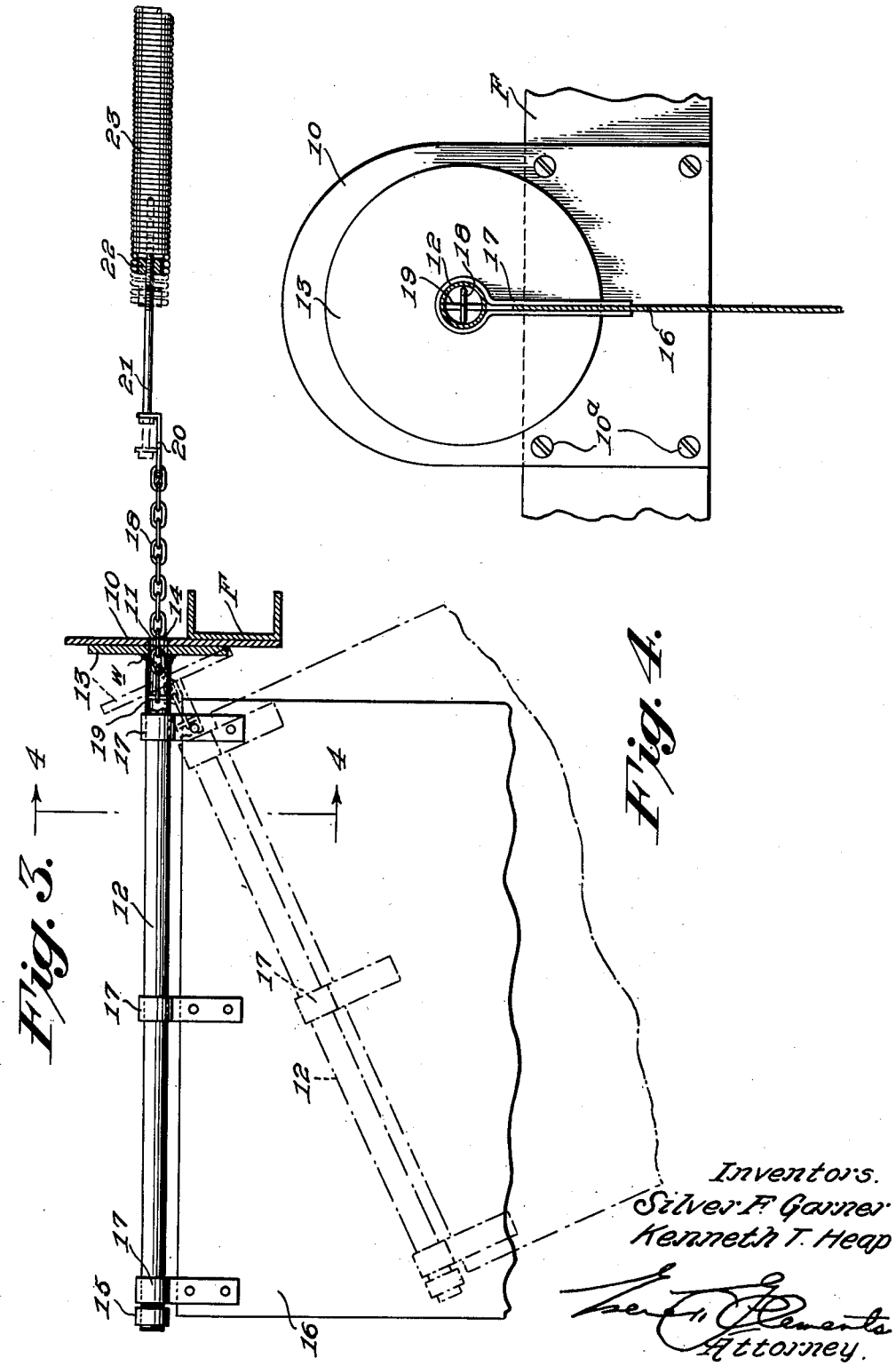

Patented June 2, 1953

2,640,714

UNITED STATES PATENT OFFICE 2,640,714

VEHICLE SPLASH GUARD CONSTRUCTION

Silver F. Garner and Kenneth T. Heap,
Grants Pass, Oreg.

Application May 26, 1950, Serial No. 164,518

8 Claims. (Cl. 280—154.5)

This invention relates to a vehicle splash guard construction.

The invention is more particularly concerned with a splash guard construction of the depending flap type wherein a flexible plate-like member is movably suspended from a vehicle part so as to extend behind each of the rear wheels to intercept mud and water which would be otherwise thrown rearwardly by the rotation of the wheels.

The improved splash guard construction and mounting means therefor according to the present invention, while not being limited to, is particularly adapted for use on the rear of trucks wherein fenders are not usually provided for the rear wheels. A primary object is, therefore, to provide an improved flexible and/or deflectable suspension means for such splash guards which may be disposed rearwardly of the rear wheel or wheels at each side of the truck frame and wherein the suspension means will support the guards for usual swinging movements and in normal operative position with respect to the truck wheels. The present supporting means will, however, permit other movements of the guards upon substantial impact with an obstruction thus allowing the guards and their suspension means to temporarily move to an inoperative position in order to avoid damage thereto.

A further object of the invention is to provide an elongated rod and supporting base therefor having a splash guard flap pivotally carried thereby so as to be swingably mounted relative to the rear wheels of a vehicle and yieldable means carried by the frame of the vehicle and connected with said rod at its base for normally holding same at right angles to a side of the frame and adjacent said rear wheels.

Another object is to provide yieldable means, as employed herein to cooperate with the frame and supporting rod under impact with an obstruction to permit the guard to temporarily move on its supporting base to a position at an angle to its normal position on the frame and thereby avoid damage to said rod and guard under impact.

Other objects and advantages of the invention will become apparent in the course of the following detailed description, taken in connection with the accompanying drawings, wherein—

Fig. 1 is a top plan view of the rear end of a truck chassis and wherein the wheels and drive are diagrammatically shown in dot-and-dash lines and wherein the invention is shown in a preferred adaptation thereof;

Fig. 2 is a rear end elevational view of the truck chassis with the invention operatively associated therewith;

Fig. 3 is a substantially enlarged view of the invention as observed in the plane of line 3—3 on Fig. 1; and Fig. 4 is a further substantially enlarged view as observed in the plane of line 4—4 on Fig. 3.

Referring now in detail to the drawings, a truck chassis is generally indicated at T and which chassis includes a frame F. While the frame is shown as extending substantially rearwardly of the rear wheels W as in the case in some types of trucks, such is not essential so far as the present invention is concerned, it being necessary only that the sides of the frame provide a support for the mud guard construction substantially in the position shown.

The improved mud guard construction comprises plates 10 and 10' which are rigidly secured to the opposite outer sides of frame F in transversely alined position as by means of screws or bolts 10a and such plates are positioned adjacent the rear edges of the wheels W. The plates 10 and 10' are provided with transversely alined apertures as is indicated at 11 in Fig. 3 and such apertures are preferably of a diameter equal to the internal diameter of the tubular flap supporting rods 12 and 12' which normally project outwardly of the opposite sides of the frame in transverse alinement as shown.

The inner ends of the tubular rods 12, 12' are rigidly secured as by welding w (Fig. 3) to discs 13, 13' which are also provided with apertures as indicated at 14 in Fig. 3 and which apertures are also preferably of a diameter equal to the internal diameters of the rods as well as to the diameters of the apertures in plates 10, 10'. The outer ends of rods 12, 12' are threaded and provided with adjustable flap retention nuts 15, 15'. Flexible flap members 16, 16' are swingably supported by and suspended from the rods 12, 12' as by means of hinges 17, 17'. A pair of chains 18, 18' are provided and the outer ends of such chains extend through the apertures 11 and 14 and into the adjacent ends of the tubular rods 12, 12' and such ends of the chains are secured to pins 19 extending through opposite wall portions of the tubular rods.

The inner end of chain 18 is secured to a right angular clip 20. A spring tension adjusting bolt 21 extends through one leg of the clip and threads into a plug 22 in the adjacent end of a relatively heavy coil spring 23 which is disposed between the opposite sides of the frame F. The inner end of the other chain 18' is directly secured to the adjacent end of the spring 23.

With the construction shown and as above described, the plates 10, 10' provide wear surfaces for the discs 13, 13' which in effect provide plane abutments on the inner ends of the flap supporting rods 12, 12' and the tension spring 23, through the chains 18, 18' normally maintains the abutments in surface contact with the wear plates and with the flap supporting rods 12, 12' projecting horizontally from opposite sides of the frame and with the flaps in proper mud guarding position at the rear of the wheels W.

It is to be observed that the flap supporting rods 12, 12' in a vehicle of the kind disclosed are readily subject to impacts from various directions, such as upon backing of the truck or an object may be dropped or caused to bear downwardly on the rods, which if rigidly connected to the frame, would break and thereby impair the action of the mud guard flaps.

Upon impact from any source on the flap supporting rods, same will readily yield as indicated by dot-and-dash lines in Fig. 3, wherein the impact is indicated as vertically downwards. Also as indicated by dot-and-dash lines in Fig. 1 the rod 12 is shown as having suffered a horizontal impact from fore to aft of the frame. The rods 12, 12' are of course, capable of deflection in directions intermediate those indicated in Figs. 1 and 3, or in fact have a universal movement. In such actions, the disc-shaped base support and abutment 13 will rock and fulcrum an edge point thereof on the plate 10 whereupon the rod 12 will assume an angular position as permitted by distention of the spring 23. Such extra tensioning of the spring will operate to exert additional force on the opposite rod supporting base 13' in maintaining the rod 12' in a normal position. Of course, the spring will allow deflection of both rods 13 and 12' at all times.

In the deflection of the rods, the chains 18, 18' are drawn through the apertures 11 and 14 as is indicated in Fig. 3, and upon the release of a deflecting force upon the rod it will be immediately drawn back to proper normal position by the spring 23, as shown.

While the rods and the rod retaining means are shown as disposed above the frame F, it will be understood that they may be disposed beneath the frame or the chains may even be extended through apertures in the frame if conditions make such an arrangement feasible or desirable.

While the invention has been disclosed in accordance with a single specific structural embodiment thereof, such is to be considered as illustrative only, and not restrictive, the scope of the invention being defined in the sub-joined claims.

What I claim and desire to secure by U. S. Letters Patent is:

1. A mud guard construction in operative association with the frame of a vehicle, comprising an apertured bearing plate secured to the outer wall of one side of the frame, an elongated tubular mud guard flap supporting rod disposed outwardly of said side of the frame and having an apertured abutment on the end thereof adjacent the frame, a coil spring within the frame and having one end thereof anchored to the opposite side of the frame, and a flexible member having one end thereof connected to the opposite end of the spring, said flexible member extending through said apertures and anchored to said rod, whereby the abutment is yieldably retained in engagement with said bearing plate by said spring.

2. The structure according to claim 1 wherein said connection of the flexible member with the spring includes an adjusting bolt for varying the tension of the spring.

3. The structure according to claim 1 wherein said anchorage of the opposite end of the spring is effected by a flap supporting rod similar to that defined.

4. In a mud guard construction for a vehicle having a frame, an apertured bearing plate secured to each side of the frame, an elongated mud guard flap supporting rod normally extending horizontally outward from each side of the frame and having a plane abutment normally engaged with the respective bearing plate, a coil spring disposed between the opposite sides of the frame, and chains having adjacent ends thereof connected to the opposite ends of the spring, the opposite ends of the chains extending through said apertures and connected to said abutments for normally holding same in yieldable engagement with said bearing plates through tension of said spring.

5. In a splash guard structure of the kind described, a bearing plate having means for rigid connection thereof to a vehicle frame and provided with an aperture, an elongated mud guard flap supporting rod having an abutment plate on one end thereof and normal thereto, an elongated tension spring in axially spaced relation to said rod and adapted for support of one end thereof from a member within said vehicle frame, and a flexible connection between the other end of said spring and said one end of said rod and extending through said aperture for yieldably holding said abutment plate in contact with said bearing plate.

6. In a mud guard construction for a vehicle, having a channel frame, an apertured plate rigidly secured to each side of the frame and having a bearing surface parallel to a face of said frame, an elongated mud guard flap supporting rod normally extending substantially horizontally outward from each side of the frame and having an abutment normally engaged with the respective bearing plate, an elongated resilient member disposed between opposite sides of the frame, and elongated flexible members having adjacent ends thereof connected to the opposite ends of the resilient member, the opposite ends of said flexible members extending through said apertures and connected to said abutments for normally holding same in yieldable engagement with said plates through tension of said resilient member.

7. The structure according to claim 6 wherein the connection between one of said flexible members and the resilient member includes longitudinally adjustable means.

8. A mounting for a splash guard flap for normally supporting same in laterally projecting position relative to the side of a vehicle chassis adjacent a wheel supported thereby, with provision for deflection of the flap from said normal operative position under impact thereto; comprising a rigid bearing plate for substantially vertical rigid support on said chassis, said bearing plate being provided with an aperture, a rigid abutment plate for rigid support on said flap adjacent an edge thereof in normally parallel relation to said bearing plate, a transversely flexible member having one end thereof extending through said aperture and attached to said abutment plate, an elongated tension spring having one end thereof connected to the opposite end of said flexible member and the opposite end of said spring being adapted for support within said chassis, whereby said spring normally yieldably urges said abutment plate into face to face bearing contact with said bearing plate with the mud guard flap disposed in said operative position.

SILVER F. GARNER.
KENNETH T. HEAP.

References Cited in the file of this patent

UNITED STATES PATENTS

| Number | Name | Date |
|---|---|---|
| 808,528 | Finney et al. | Dec. 26, 1905 |
| 954,588 | Randall | Apr. 12, 1910 |
| 1,526,742 | Chapel | Feb. 17, 1925 |
| 1,947,525 | Hume | Feb. 20, 1934 |
| 2,038,234 | Olen | Apr. 21, 1936 |
| 2,094,475 | Schwarzhaupt | Sept. 28, 1937 |
| 2,397,151 | Mitchell | Mar. 26, 1946 |
| 2,414,676 | Taurman et al. | Jan. 21, 1947 |
| 2,461,044 | Ely | Feb. 8, 1949 |
| 2,482,630 | Mastromarino | Sept. 20, 1949 |

FOREIGN PATENTS

| Number | Country | Date |
|---|---|---|
| 566,736 | Great Britain | Jan. 11, 1945 |